United States Patent [19]
Chen et al.

[11] Patent Number: 5,458,392
[45] Date of Patent: Oct. 17, 1995

[54] MOUNTING BRACKET FOR AERODYNAMIC FAIRING

[75] Inventors: David E. Chen; Norbert E. Romie, both of Fort Wayne, Ind.

[73] Assignee: Navistar International Transporation Corp., Chicago, Ill.

[21] Appl. No.: 321,067

[22] Filed: Oct. 11, 1994

[51] Int. Cl.$^6$ .................................................. B62D 35/00
[52] U.S. Cl. ........................................ 296/180.2; 296/180.1
[58] Field of Search ............................... 296/180.1, 180.2, 296/180.4

[56] References Cited

U.S. PATENT DOCUMENTS

| | | | |
|---|---|---|---|
| 4,082,341 | 4/1978 | Gore | 296/180.2 |
| 4,316,630 | 2/1982 | Evans | 296/180.2 |
| 4,749,220 | 6/1988 | Adams et al. | 296/917 |
| 5,174,626 | 12/1992 | Wiley, Jr. et al. | 296/180.2 X |

OTHER PUBLICATIONS

"PC-9700 Set Back Front Axle Parts Catalog," Navistar International Transportation Corp., Oct. 1987, Unit 16-016, pp. 1-3, Unit 16-017, p. 1.

Primary Examiner—Joseph D. Pape
Attorney, Agent, or Firm—Dennis K. Sullivan

[57] ABSTRACT

A mounting bracket for mounting an aerodynamic fairing to a truck roof includes a base plate appropriately configured to seat on the roof within the fairing and a fairing engaging face having mounting holes which is oriented when the bracket is mounted to the roof to engage the interior side of the fairing. Depending from the face is a tongue terminating in an outturned tab upon which a bottom edge of a fairing may be seated to establish the appropriate desired clearance between the fairing and the underlying cab roof surface. The tab also serves as a locating member over which a template may be appropriately positioned to indicate the position of the mounting holes in the face of the bracket so that properly aligned cooperating holes may be drilled through the fairing from the exterior surface thereof to permit mounting bolts to attach the fairing to the bracket and the roof.

10 Claims, 2 Drawing Sheets 5,458,392

MOUNTING BRACKET FOR AERODYNAMIC FAIRING

BACKGROUND OF THE INVENTION

The present invention relates to a mounting bracket for attaching an aerodynamic fairing to a truck having cab roof contour edges disposed adjacent the edges of the aerodynamic fairing. More particularly, the mounting bracket includes an angled base plate which is mounted to the cab roof while accommodating the contour thereof and a deflector engaging face attached to the base plate for engagement of an interior surface of the aerodynamic fairing adjacent the roof, the lower end of the face including an outwardly extending tab thereon which engages the lower edge of the fairing to control the gap between the fairing and the cab roof. The tab further serves as a position indicator to permit the drilling of mounting bolt holes in the fairing from the exterior side which are properly positioned so that the mounting bolts will engage the otherwise blind holes disposed in the mounting bracket on the interior side of the fairing.

THE PRIOR ART

An aerodynamic fairing for trucks is a relatively heavy and bulky article that is difficult to maintain in position while it is being attached to the cab roof. Appropriate spacing between the roof and a bottom edge of the fairing must be maintained for aerodynamic efficiency.

Heretofore, most truck cabs or non-integrated truck sleeper boxes have been provided with a flat roof to which an aerodynamic fairing could be simply mounted. However, low profile contoured tractor cab roofs, such as those on integrated sleeper cabs, have become popular and the fairing has become much more difficult to mount appropriately.

Due to aerodynamic considerations, the mounting brackets must be disposed completely within the fairing and typically attached by nuts and bolts to a mounting bracket attached to the cab roof. Such attachment was simply done in flat cab roof environments with the fairing being drilled from the interior side through the mounting structure to assure alignment of mounting holes in the fairing and the brackets. However, the curve or hump in a low profile cab roof precludes drilling into the fairing from the interior side thereof and the holes must be drilled through the fairing from the exterior or front surface thereof, with the bolts being engaged from the same surface, through the fairing and into the bracket therebehind. This process now becomes a blind process because the bracket is behind the fairing, and is blocked for drill through access from the back side by the contoured area of the curve in the roof.

SUMMARY OF THE INVENTION

Accordingly, it is a primary object of the invention described and claimed herein to provide a mounting bracket for attaching an aerodynamic fairing to a truck cab roof having structure for properly positioning the aerodynamic fairing during mounting thereof.

A further object of the invention described and claimed herein is to provide a mounting bracket for attaching an aerodynamic fairing to a truck cab roof having exteriorly visible structure for locating and drilling properly positioned mounting holes for anchoring the fairing to a bracket positioned adjacent the interior side of the fairing. These and other objects of the invention are specifically met by the bracket of the present invention which comprises a base plate appropriately configured to seat on the roof within the fairing and includes a fairing engaging face having mounting holes which is oriented when the bracket is mounted to the roof to engage the interior side of the fairing. Depending from the face is a tongue terminating in an outturned tab upon which a bottom edge of a fairing may be seated to establish the appropriate desired clearance between the fairing and the underlying cab roof surface. The tab also serves as a locating member over which a template may be appropriately positioned to indicate the position of the mounting holes in the face of the bracket so that properly aligned cooperating holes may be drilled through the fairing from the exterior surface thereof to permit mounting bolts to attach the fairing to the bracket and the roof.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 2:
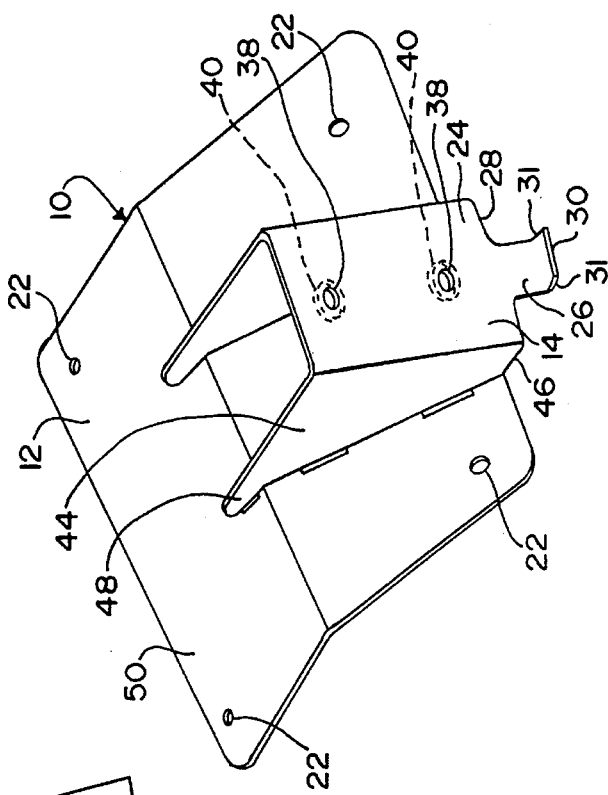
FIG. 2 is an enlarged perspective view of one bracket made in accordance with the teachings of the present invention.
Figure 1:
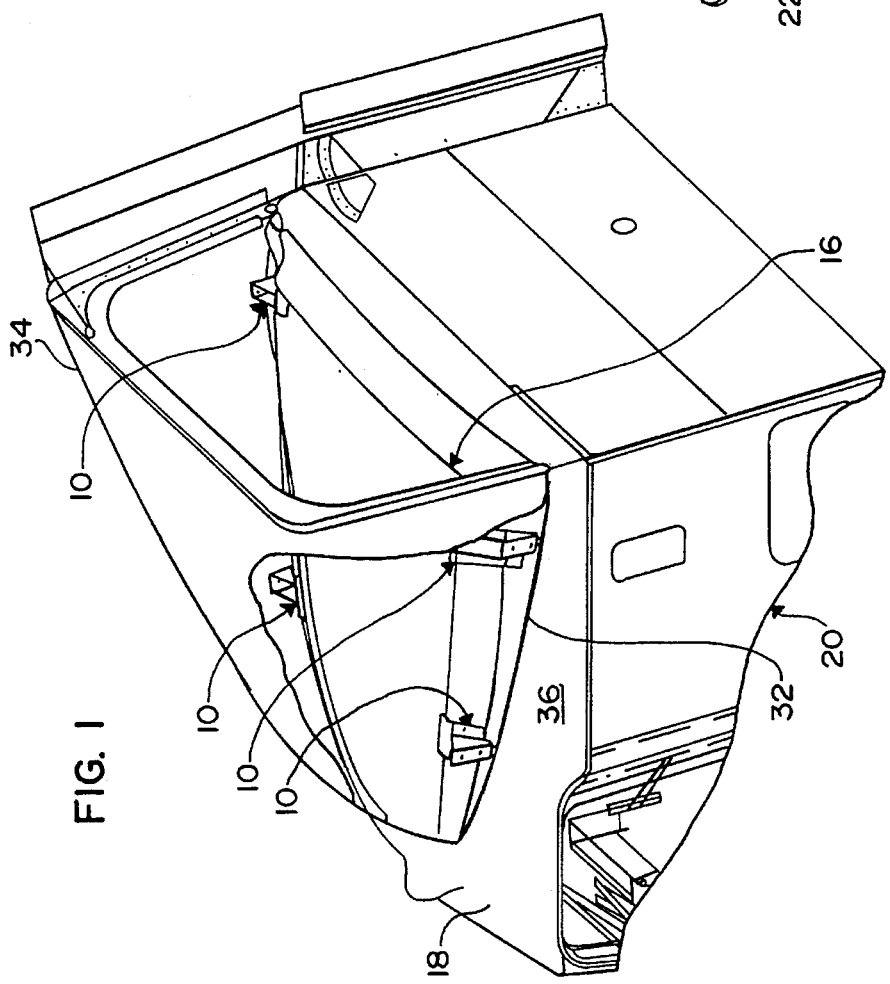
FIG. 1 is a perspective view partially cut away showing an aerodynamic fairing engaged to a contoured cab roof using a plurality of brackets made in accordance with the teachings of the present invention.

Referring now to the drawings in greater detail, there is illustrated therein the mounting bracket for an aerodynamic fairing made in accordance with the teachings of the present invention and generally identified by the reference numeral 10.

As shown, the bracket 10 is a two piece structure comprising a base plate 12 to which a fairing engaging element 14 is fixed, such as by fill welding.

The base plate 12 is shown here to be an angled, substantially planar plate 12 disposed to fit the top and side portions of a hump 16 formed in a contoured roof 18 of a truck cab 20 or a truck sleeper box (not shown).

Figure 3:
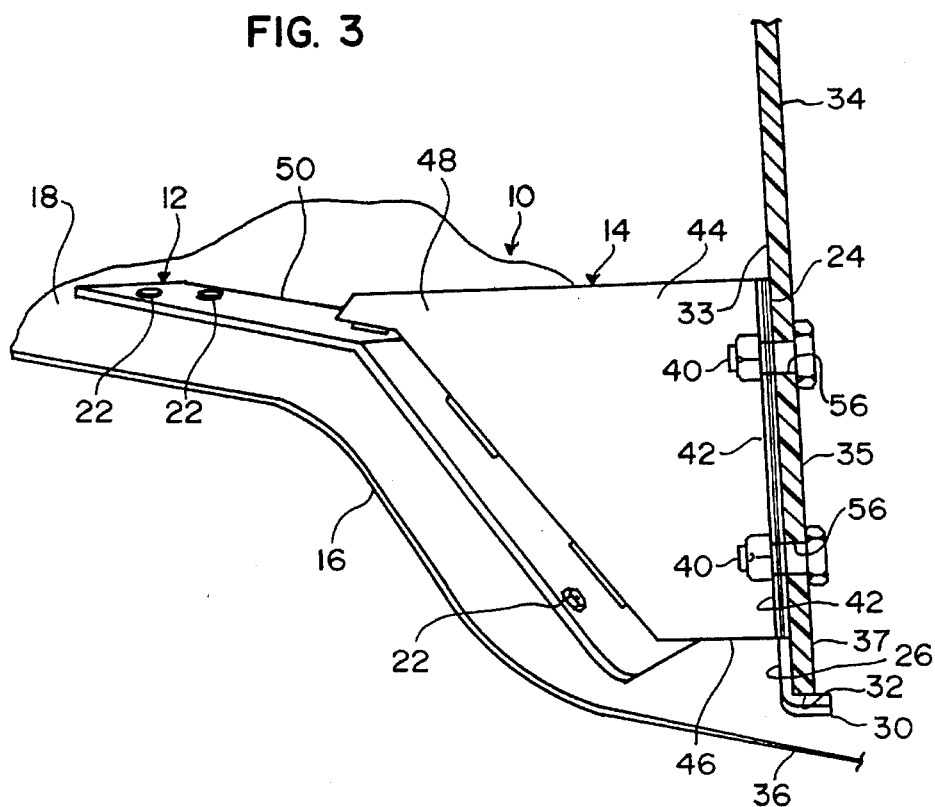
FIG. 3 is an side view of the bracket of FIG. 2 mounted to a contoured area of a cab roof, the lower portion of an aerodynamic fairing being attached thereto in accordance with the invention.

Thus, when the base plate 12 is seated over the end edge angle of the hump 16, it lies contiguously along both surfaces of the hump 16 as best shown in FIG. 3 and can be fixed to roof reinforcements (not shown) underlying the hump 16 beneath the skin thereof. Fixation of the base plate 12 to the roof reinforcements may be made in any suitable fashion, such as nut and bolt assemblies 22. It will be understood that the base plate 12 may be of any size and angulation required for the particular application onto a specific contoured roof area hump 16.

Turning now to the fairing engaging element 14, it will be seen in FIGS. 2 and 3 that the element 14 includes an elongate planar face 24 which engages the interior surface of a conventional aerodynamic fairing 34 disposed over the roof with a generally vertical lower wall portion 37 extending generally along the perimeter of the roof so that the mounting brackets 10 are disposed within the fairing 34 as is conventional. The fairing engaging element 14 has a tongue 26 extending from a bottom edge 28 thereof to an outwardly outturned fairing-engaging tab 30 extending from the face surface slightly more that the thickness of the fairing wall to support a lower edge 32 of the fairing 34 in a position located a predetermined distance above the underlying cab roof area 36. The outturned tab 30 further serves as a locating tab for drilling mounting holes through the fairing 34 from the exterior side 35 thereof as will be described hereinafter. This tab 30 is centered below a linear plurality of bolt holes 38 drilled through the face 24 of the element 14 at predetermined locations along the height thereof and at least one and preferably both of the forward or rearward edges 31 of the tab are precisely located relative to the bolt holes 38 to form a locating means for determining the position of mounting holes to be drilled in the fairing 34 as will be discussed below.

When attachment of the fairing 34 to this face 24 is to be made using a nut and bolt combination, a weldnut 40 may be secured in place about each bolt hole 38 on a backside 42 of the face 24 for reasons to be explained hereinafter.

Extending from the face 24 in a direction opposite the tab 30 are two side flanges 44 which are welded to the base plate 12 and which are dimensioned to maintain the face 24 of the element 14 in a generally vertical plane, corresponding to the angle of the inner surface of the fairing 34, when the base plate 12 is mounted over the hump 16 in the roof 18. To create such vertical orientation to the face 24, the side flanges 44 must typically taper upwardly from a bottom edge 46 thereof, with an upper section of each flange 44 defining a wing 48 affixed to the base plate 12 along a substantially horizontally disposed surface 50 thereof which rests upon the top surface of the cab roof 18 to add further stability to the element 14.

Figure 4:
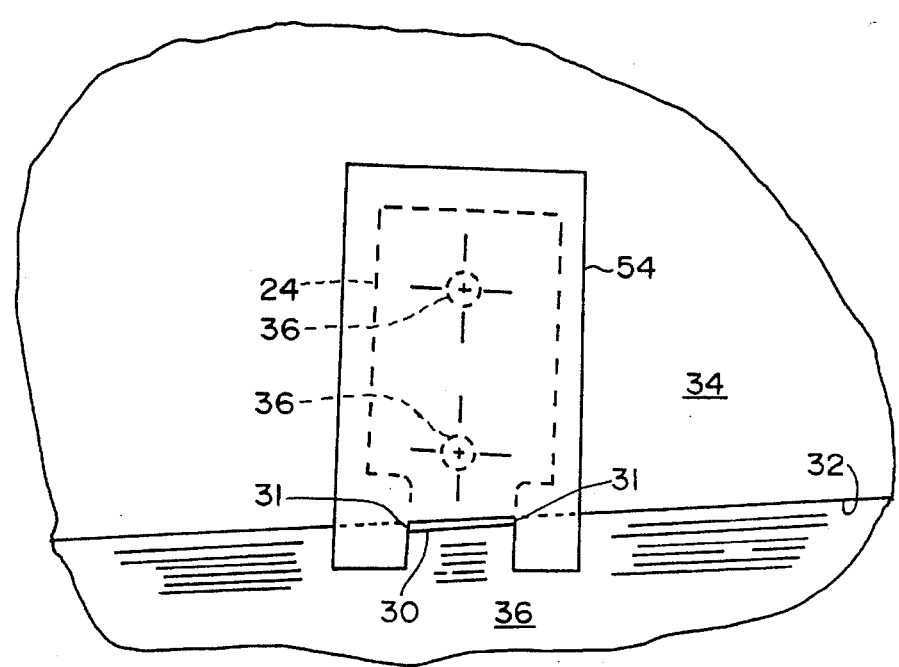
FIG. 4 is an elevation of a portion of the exterior of the aerodynamic fairing of FIG. 1 in the process of being mounted to the cab roof and shows the fairing engaging to the bracket tab and a template placed thereon for drilling the mounting holes.

An additional consideration deals with the distance allowable between the tab 30 depending from the bottom edge 28 of the face 24 of the element 14 and the area 36 of the cab roof 18 underlying same. In this respect, the fairing 34 is being engaged to the cab roof 18 to enhance aerodynamics of the vehicle. Too large a gap between the bottom edge 32 of the fairing 34 and the cab roof 18 will decrease aerodynamic efficiency. Through empirical testing, it has been found the a gap of approximately ½ inch (1.3 cm) is well tolerated without compromising aerodynamic efficiency. Consequently, the tab 30 must be located at such desired height relative to the underlying cab roof surface 36. Further, to accommodate sloping of the truck roof 18 and/or an uneven bottom edge 32 of the fairing 34, as best seen in FIG. 4, the tab 30 may need to be angled with a forward or rearward pitch to assure the provision of a uniform gap between the bottom edge 32 of the fairing 34 and the area 36 of the cab roof 18 therebeneath. Thus, it will be understood that the bracket 10 will be specifically adapted for a particular cab roof 18 structure.

During installation of a fairing on the roof 18, the base plate 12 is positioned along the hump 16 of a contoured cab roof 18 and is secured to supports thereof in any suitable manner. Once a plurality of such brackets 10 have been installed, the fairing 34 for the cab roof 18 is raised into position, with the lower edge 36 thereof resting on the tabs 30 of each of the brackets 10.

The problem of attaching the fairing 34 to the brackets 10 now arises. In this respect, it will be understood that the hump 16 in the contoured roof 18 precludes drilling through the fairing 34 from the inner side 33 since a drill cannot be extended through the holes 36 of the face 24 from the rear because the holes are located below the top surface of the hump 16. Thus, drilling must now take place from the exterior side 35 of the fairing 34. It will be understood that the holes 36 are now behind the fairing 34, out of view. To assure accurate drilling, a template 54 for drilling mounting holes 56 through the fairing from the exterior side is provided, the template being seated on the upper side of the tab 30 and being positioned fore and aft along the fairing wall 35 by the forward or rearward edge 31 of the tab 30. The template is provided with indicia, such as the centerlines illustrated in FIG. 4, disposed to be in alignment with the holes 36 in the bracket face 24 therebehind.

As stated above, the engagement between the fairing 34 and the bracket 10 may be made using any suitable means. In this case, bolts 58 extend through the mounting holes 56 into the weldnuts 40 to secure the fairing to the face 24 of the fairing engaging element 14, as shown in FIG. 3.

As defined above, the aerodynamic fairing mounting bracket provides a number of advantages which have been described above or are inherent in the invention. It will be evident to those of ordinary skill in the art that modifications and alterations can be made in the preferred embodiment without departing from the invention. For example, although taught in connection with a truck cab having an integrated sleeper compartment, the invention could obviously be used either on a truck cab without a sleeper compartment or on the roof of a separate sleeper compartment. Accordingly, the scope of the invention is only to be limited in accordance with the accompanying claims.

What is claimed is:

1. A mounting bracket for attaching an aerodynamic fairing to a roof of a truck comprising:

a base plate configured to engage the roof;

and a fairing engaging element connected to the base plate having a planar face disposed to engage an inner surface of said fairing, said fairing engaging element having at least one mounting bolt hole disposed in said face and an outturned locating tab extending away from said face in a direction opposite said base plate a sufficient distance to support a lower edge of the fairing thereon.

2. The bracket of claim 1 wherein said fairing engaging element includes a depending tongue from which said outturned tab extends.

3. In combination with a truck having a roof, an aerodynamic fairing disposed on said roof, said fairing having a lower wall portion having a lower edge disposed adjacent said roof, a mounting bracket for attaching said fairing to said roof comprising:

a base portion secured to said roof within the periphery of said fairing;

a fairing engaging element portion, said fairing engaging element portion including an abutment surface engaging an inner surface of said fairing;

cooperative means for attaching said fairing to said mounting bracket; and a fairing lower edge support extending beyond said abutment surface, said lower edge support being engageable during mounting of the fairing to said bracket by said lower edge of said fairing.

4. The invention in accordance with claim 3 and said lower edge support including a locating portion accessible from the exterior side of said fairing, said locating portion being precisely positioned in a fore and aft direction relative to said cooperative means.

5. The invention in accordance with claim 4 and said lower edge support comprising a tab and said locating portion comprising an edge of said tab.

6. The invention in accordance with claim 3 and said fairing engaging element abutment surface having said cooperative means disposed therein, a portion of said surface extending downwardly to said lower edge support.

7. The invention in accordance with claim 6 and said lower edge support comprising an outturned tab extending from the plane of said abutment surface.

8. The invention in accordance with claim 7 and said outturned tab having a locating edge precisely disposed relative to said cooperative means.

9. The invention in accordance with claim 8 and said cooperative means comprising a pair of apertures in said abutment surface and weldnuts attached to said fairing engaging element and aligned with said apertures.

10. A method of mounting an aerodynamic fairing to a truck roof comprising the steps of:

mounting a plurality of brackets to the truck roof, each of said brackets having a fairing engaging face including mounting holes disposed therein, the brackets further including an outturned tab extending away from said face;

creating a drill template having a locating portion engageable with said outturned tab and indicia of said fairing engaging face mounting holes relative to said locating portion;

lifting a fairing onto the roof and seating a lower edge of the fairing on the tab of each underlying bracket;

positioning the template over the exterior surface of the fairing with the locating portion of the template engaging the bracket tab;

drilling through the template and fairing to create mounting holes in the fairing which align with mounting holes in the bracket therebehind; and installing fasteners through the mounting holes in the fairing and bracket to thereby draw the fairing into abutment with the fairing engaging face of the bracket.

\* \* \* \* \*